Feb. 13, 1968  W. W. POPE  3,369,190
PHASE LOCKED INDICATOR FOR PLURALITY OF OSCILLATORS
PHASE LOCKED TO COMMON REFERENCE
Filed Feb. 15, 1967  2 Sheets-Sheet 1

INVENTOR.
WOODROW W. POPE
BY
*Moody & Anderson*
AGENTS

United States Patent Office 3,369,190
Patented Feb. 13, 1968

3,369,190
PHASE LOCKED INDICATOR FOR PLURALITY OF OSCILLATORS PHASE LOCKED TO COMMON REFERENCE
Woodrow W. Pope, Garland, Tex., assignor to Collins Radio Company, Cedar Rapids, Iowa, a corporation of Iowa
Filed Feb. 15, 1967, Ser. No. 616,347
6 Claims. (Cl. 331—44)

This invention relates generally to monitoring means and more particularly to a monitoring and indicating system for indicating improper operation of a plurality of oscillators which are phase locked to a common reference frequency source.

Oftimes, in communication systems, and particularly in systems employing multiplexing wherein a plurality of multispaced tones or channels are employed such as in Kineplex communication systems, it is necessary that a plurality of oscillating sources be maintained in precise frequency separation and phase locked in order to assure correct system operation.

In such systems, it is common to generate a plurality of precisely spaced tones from a highly stable frequency standard and to include means for phase locking each of the tones to a reference frequency source. For example, a plurality of oscillators might be controlled by accurate 1-kc. strobing pulses which are applied in common to each of the oscillators with each oscillator being tuned to and precisely phase locked to a particular harmonic of the accurate strobing signal.

A purpose of the present invention is the provision of a monitoring means to cooperate with such a frequency generating system and provide an alarm output or other type of indication should the reference pulse train fail, should any one of the oscillators be out of phase lock, or should any one of oscillators itself fail. Either of the three conditions constitutes a malfunction of the system. The monitoring system of the present invention responds to any one or more of the three types of failures to provide a warning. The present invention is featured in the provision of a logic circuitry requiring a minimum of components and by means of which a warning is presented in the event of any one of the three above described types of circuit failure.

Figure 1:
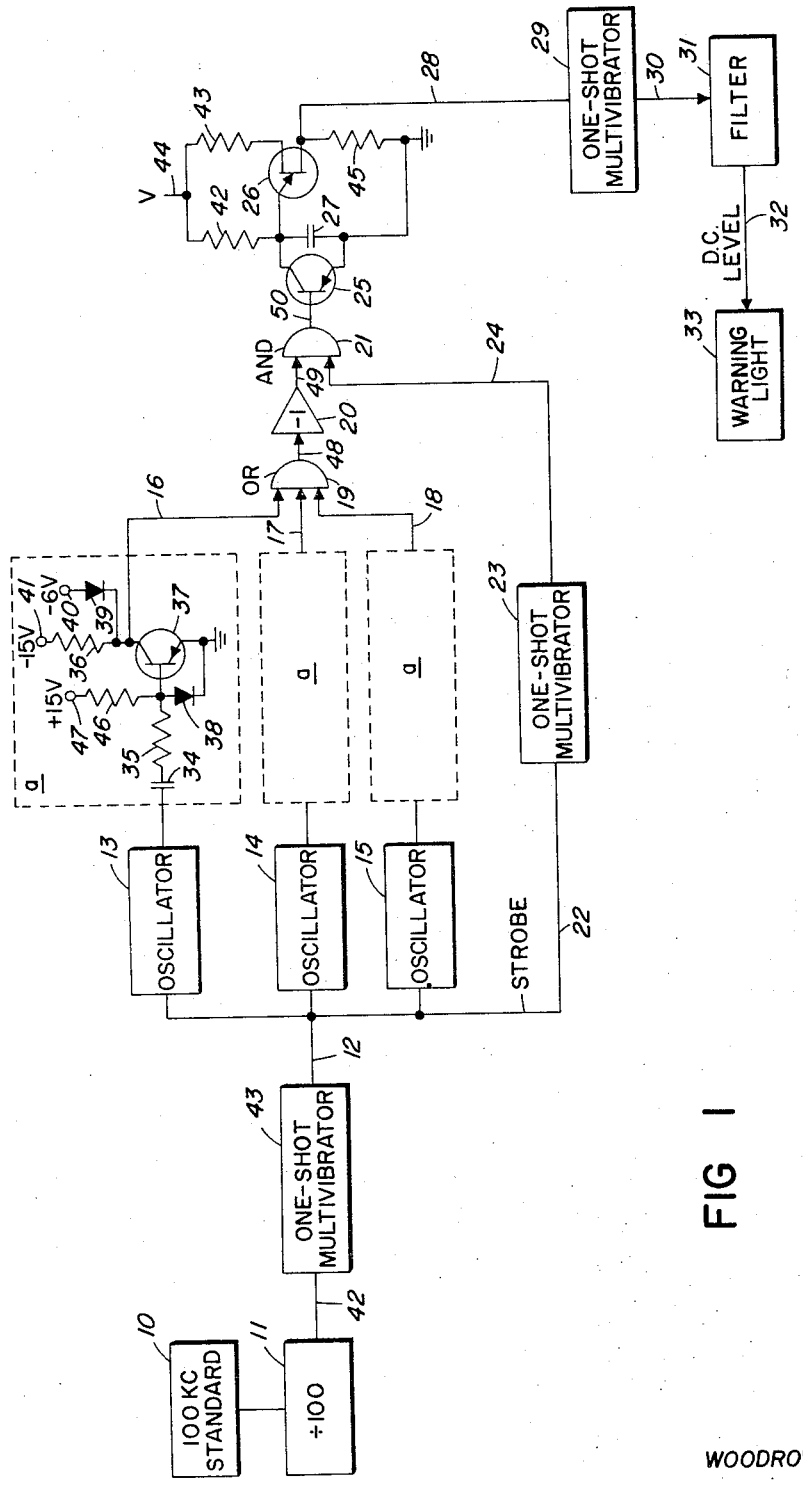
Figure 2:
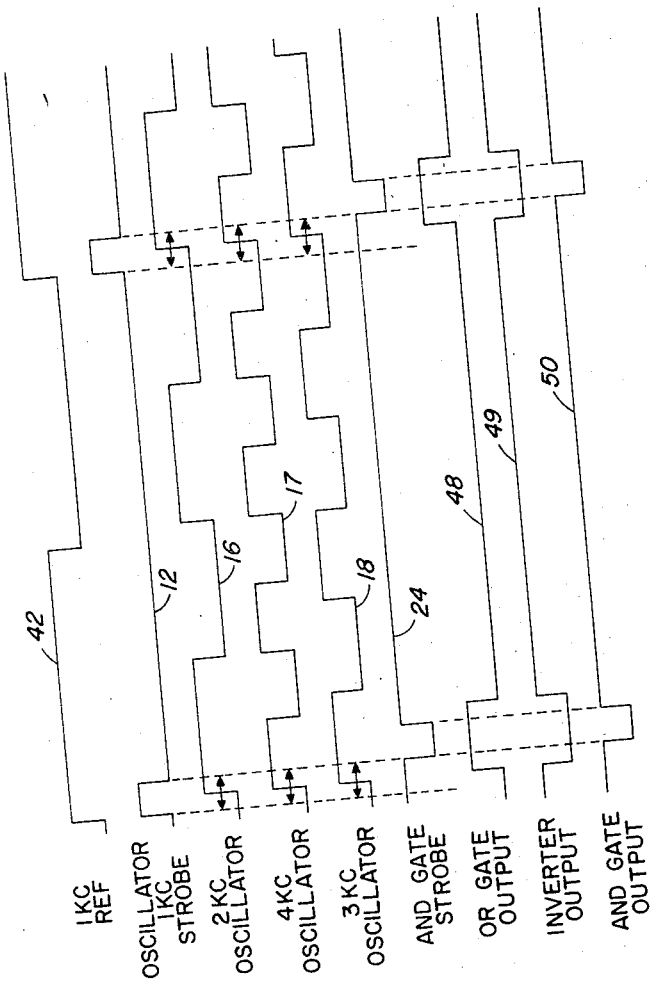

The present invention may best be comprehended from reading the following description in conjunction with the accompanying drawings in which;

FIGURE 1 is a block diagram of a multiple frequency generating system of the above described type including the monitoring means of the present invention; and FIGURE 2 is a diagrammatic representation of waveforms illustrating the basic logic upon which the present invention performs its monitoring function.

As mentioned above, the present invention relates to an indicating means, such as a warning lamp or other device which indicates malfunction in a system employing a plurality of oscillators which are all precisely phase locked to a harmonic of reference frequency source. FIGURE 1 illustrates three such oscillators, 13, 14, and 15 each of which is phase locked to a frequency standard. In the system depicted in FIGURE 1, the standard is a 100-kc. oscillator 10 the output of which is applied to a divider 11 to develop a train of 1-kc. reference pulses 12. Strobing pulses 12 are applied in common as frequency and phase controlling input to each of the oscillators 13, 14, and 15.

Each of the oscillators 13–15 is tuned to and operates to develop a substantially square wave output at a frequency which is a multiple of the 1-kc. strobing pulse train 12. Each of the oscillators 13–15 might be of a type as described in copending application, Serial Number 555,345 entitled "Phase Locked Crystal Controlled Oscillator" filed June 6, 1966 by George C. Wilkinson, Jr., assignee to the assignor of the present invention, now Patent No. 3,345,579. The type of oscillator described in the referenced copending application provides a substantially square wave output between two voltage or logic levels and may be precisely phase locked to a strobing input signal such that the oscillator starts a new cycle (such as a positive or negative half-cycle) each time the strobing pulse input is applied to the oscillator. The oscillator employs a phase shifting circuit in conjunction with a crystal and feedback means wherein the oscillator may be precisely phase locked to a predetermined harmonic of the strobing input signal.

FIGURE 2 illustrates functionally output waveforms depicting a plurality of operating frequencies wherein each of the outputs is a square wave defined by zero volt and —6 volt operational levels. The second waveform of FIGURE 2 is a reference strobing pulse 12 as applied in common to each of the several oscillators, while the subsequent waveforms illustrate various harmonics or multiples of the 1-kc. strobing input as applied to the OR gate 19 of FIG. 1. For this purpose, waveforms at the second, third and fourth harmonics of the 1-kc. strobing pulse are depicted as "going positive" during the time that the 1-kc. strobe pulse 12 is "positive" or at zero volt. It is to be understood that the waveforms of FIGURE 2 are for the purpose of explanation only and that, in an actual operating system, the waveforms would be at substantially higher frequencies; each frequency, however, being a multiple of the 1-kc. strobing input pulse 12.

Reference to the waveforms of FIGURE 2 indicates that each of the waveforms (16, 17, and 18), is "going positive" during the time the 1-kc. strobing waveform 12 is positive and all stay positive for a period equal to one half cycle at the highest frequency. At any other time reference, one or more of the waveforms will not be in this operational state, therefore, if the strobing time is defined as the pulse width of the 1-kc. waveform 12 (the time the pulse is at the zero-volt level) it is noted that within this time only, are all of the remaining output waveforms which are multiples of the 1-kc. reference going "positive" and will remain positive for a period of time. This relationship then leads to the logic of the warning system of the present invention which, as will be further described, employs a strobing pulse as indicated in FIG. 2 the time occurrence of which defines a time-slot within which all of the oscillator waveforms are going to a like operational state. If all of the waveforms are going to this like operational state within the time slot defined by the strobe pulse, the desired phase lock condition exists in the system. If any one of the oscillators is out of phase lock, its operational state (zero or —6 volts) will not agree. By means to be further described, should any one of the oscillators fail in either of the operational levels (zero or —6 volts), the logic circuitry will likewise provide a warning. Further should the strobing signal source 12 fail the system will provide a warning.

With reference to FIGURE 1, each of the oscillators is applied to an output circuitry referenced as a. Only the oscillator output circuit a associated with oscillator 13 of FIGURE 1 is shown in schematic detail, it being understood that the remaining oscillator output circuits would be identical in make-up. Each of the circuits a functions to pass an inverted or complementary form of the oscillator signal applied thereto when the associated oscillator is operating normally. Each of the circuits a is adapted to provide a —6 volt output if the associated oscillator fails in either of the operational levels (0 volt or —6 volts).

With reference to FIGURE 1, each of the oscillator output circuits *a* is comprised of a transistor 37. The oscillator output is coupled to the base of transistor 37 through capacitor 34 and resistor 35. The base of the transistor is connected to ground through diode 38 and through a high resistance 46 to the positive voltage source 47. The emitter of the transistor 37 is grounded. The collector is connected through a resistor 36 to a negative voltage source 41 and through a diode 39 to a further negative voltage source 40. Voltage source 40 might be a —6 volt source and voltage sources 41 and 47 might be —15 volts and +15 volts, respectively. An output 16 is taken from the collector of the transistor.

In operation, the time constant of capacitor 34 and resistor 35 is very long compared to the frequency of the associated oscillator. During the normal application of a pulse train from the associated oscillator, capacitor 34 charges through the base-emitter junction of the transistor during the —6 volt levels of the input waveform and bucks out the base current due to the high resistance 46 and the positive voltage source 47, which collectively functions as a constant current source. However, capacitor 34 is large and appears as a short circuit at the input frequency so that before it can appreciably charge, the oscillator input frequency has reverted to the zero operational level. As a result, the output circuitry functions in a normal manner providing an inversion of the input waveform at the collector. If the oscillator input should fail at the —6 volt operational level, capacitor 34 charges to —6 volts with a time constant equal to the RC of 34 and 35, and the base of the transistor is not provided with current so that the transistor is rendered nonconductive by the connection through high resistance 46 to the positive voltage source 47. With the transistor 37 in a nonconductive state, the collector-emitter junction thereof represents a high impedance such that the collector is held at a —6 volt level by clamp diode 39. Should the oscillator input fail at the zero level, the collector of the transistor 35 is likewise held at a —6 volt level. Only during the normal application of the oscillator input does the oscillator output circuit *a* function as an inverter.

The outputs 16, 17 and 18 of each of the oscillator output circuitries *a* are applied in common as inputs to an OR gate 19. The output from OR gate 19 is applied to an inverter 20 and the output from inverter 20 is applied as a first input to an AND gate 21. The second input to AND gate 21 is a strobing pulse 24 as depicted in FIGURE 2. Strobing pulse 24 is a —6 volt level pulse developed in a one-shot multivibrator 23 which receives the 1-kc. reference strobing signal 12 as an input on line 22. One-shot multivibrator 23 develops a pulse of predetermined duration going from 0 to —6 volts in response to each of the 1-kc. clock pulses 12 which in turn establish the phase locked condition of the plurality of oscillators 13–16. The width of the pulse from multivibrator 23 would be selected as less than the time duration of one half cycle at the highest oscillator operating frequency.

Assuming correct circuit operation, the output of AND gate 21 would be a train of pulses at a 1-kc. rate and duration defined by the pulse width of the output of one-shot multivibrator 23 or by the time between the initiation of each pulse from multivibrator 23 and the next subsequent change in state of the highest frequency oscillator in the system being monitored. This pulse train is developed only if, (1) all of the oscillators are operating, (2) all of the oscillators are phase locked to the 1-kc. reference 12 and (3) the 1-kc. reference signal is present in the system. In the absence of any one of the above defined three conditions, there would be no output from AND gate 21 since any one of the three conditions would present a —6 volt level from OR gate 19 and correspondingly zero logic level from inverter 20 at the time occurrence of the —6 volt level pulse from one-shot multivibrator 23 to effect an inhibiting action.

The basic logic discussed thus far has been defined and one might use the output of the AND gate 21 per se as a warning—that is, a train of 1-kc. pulses out of AND gate 21 would indicate the system being in operational order and the lack of an output from AND gate 21 would indicate that at least one of the three above defined malfunctions was present.

A still further arrangement depicted in FIGURE 1 may, however, receive the output from AND gate 21 and automatically light a warning lamp 33 in the event that the system being monitored fails in either of the three above-defined categories. The output from AND gate 21 is shown applied to the base of a transistor 25. Transistor 25 is associated with a relaxation oscillator employing a unijunction transistor 26. A capacitor 27 is connected between the emitter of unijunction transistor 26 and common ground, and capacitor 27 shunts the emitter-collector junction of transistor 25. The collector of the transistor 25 is connected through resistor 42 to a voltage source 44 as is a first base electrode of the unijunction transistor 26 through resistor 43. A second base electrode of unijunction 26 is returned to common ground through resistor 45 and an output 28 is taken from this latter base electrode. In operation (disregarding for the moment the interconnection with transistor 25), the unijunction transistor 26 and associated circuitry operate as a relaxation oscillator the period of which, as defined by the capacitor 27 and associated resistors is greater than that of a 1-kc. wave. Therefore, in the absence of an input to transistor 25 from AND gate 21 (which indicates a fault exists) the relaxation oscillator develops an output pulse on line 28 which may be applied to a further one-shot multivibrator 29 to develop a square wave of appreciable duty cycle on output line 30. Line 30 is connected to a filter 31 from which is developed an output 32 corresponding to the DC level of the pulse applied to the filter. The DC level output from filter 31 may be utilized to energize the warning lamp. The DC level is developed only during normal operation of the relaxation oscillator which occurs only in the absence of an input pulse train being applied to associated transistor 25.

With correct system operation, the output from AND gate 21 was described above as being a train of 1-kc. pulses which are applied to the base of transistor 25. Since the normal period of the relaxation oscillator is longer than that defined by a 1-kc. pulse train, the pulses applied to the base of transistor 25 render the transistor conductive at 1-kc. intervals so as to provide a low impedance discharging path for capacitor 27. The discharging is sufficient that unijunction transistor 26 does not fire (its firing threshold is not reached by the charge on capacitor 27 as during normal operation); there is thus no output pulse train 28 from the relaxation oscillator; the one-shot multivibrator 29 is not fired; no DC level is developed on line 32, and the warning light 33 is not energized.

The invention is thus seen to provide an indicating system for monitoring the operation of a plurality of phase locked oscillators to provide a warning should any one of the oscillators fail, should the common reference strobing source fail, or should any one of the oscillators be out of phase lock with the reference strobing source.

Although this invention has been described with reference to a particular embodiment thereof it is not to be so limited as changes and modifications may be made therein which fall within the spirit and scope of the invention as defined by the appended claims.

I claim:

1. In a system comprising a plurality of oscillators each of which generate a harmonic of a reference frequency and is frequency and phase locked to said reference frequency, each of said oscillators developing a substantially square wave output signal defined by first and second voltage levels and each said oscillator output changing from one of said voltage levels to the other in time correspondence with the duration of a first reference frequency strobing pulse, said first reference frequency strobing pulse being generated in time correspondence with each successive cycle of said reference frequency source, means for monitoring the phase-locked relationship between said reference frequency source and each of said oscillator outputs comprising; an OR gate receiving the output waveform from each of said oscillators, an AND gate receiving the output from said OR gate as a first input thereto, means for initiating a second reference strobing pulse in time correspondence with the trailing edge of said first reference strobing pulse and with duration being less than that defined by one half cycle of the highest operating frequency of said plurality of oscillators, the voltage level of said second reference strobing pulse being like that of the equal voltage levels to which the outputs of said plurality of oscillators as applied to said AND gate change during the time duration of said first reference frequency strobing pulse, said AND gate receiving said second reference strobing pulse as a second input thereto, said AND gate developing an output pulse train at a rate defined by said reference frequency with pulse durations defined as the time between the initiation of successive ones of said second strobing pulses and the next subsequent change in voltage level of any one of said inputs to said AND gate, said AND gate output pulse train being generated only if said reference strobing pulses are present in the system, each of said plurality of oscillators is operative and each of said plurality of oscillators is phase locked to said reference frequency source, said phase locked relationship being defined as a like change in voltage levels of said oscillator outputs occurring within the time defined by said first reference strobing pulse.

2. A monitoring system as defined in claim 1 wherein the outputs of each said plurality of oscillators are applied to an associated signal translating circuit prior to application to said OR gate, each of said signal translating circuits being adapted to generate the complement of the input oscillator waveform applied thereto during normal oscillator operation, each of said signal translating circuits being adapted to develop an output as applied to said AND gate opposite that of the voltage level of said second reference frequency strobing pulses should the oscillator input thereto fail at either one of the voltage levels defining the oscillator waveform, whereby said second reference strobing pulses are inhibited by said AND gate should any one of the plurality of oscillators fail at either of the voltage levels defining the oscillator output waveforms.

3. A monitoring means as defined in claim 2 wherein each of said signal translating circuits comprises a transistor, the associated oscillator output signal being applied to the base of said transistor through an RC network the time constant of which is long compared to a period of one cycle of the input waveform, the base of said transistor being connected to a constant current source, the emitter of said transistor being connected to a voltage reference corresponding to a first one of the voltage levels defining said oscillator waveform, the collector of said transistor being connected through a resistor to a first voltage source and through a diode to a second voltage source, said second voltage source corresponding to the second one of said voltage levels defining said oscillator waveforms, said first and second voltage sources collectively forward biasing said diode, an output taken from the collector of said transistor being an inverted form of the input oscillator waveform during normal operation of said oscillator, said collector output being clamped at the level defined by said second voltage source should the input oscillator waveform fail at either of the voltage levels defining the oscillator waveform.

4. A monitoring system as defined in claim 3 further comprising pulse generating means receiving the output from said AND gate, said pulse generating means generating in the absence of an input pulse train from said AND gate an output pulse train of predetermined repetition rate and pulse duration, said pulse generating means being inhibited by the application of a pulse train from said AND gate, and means receiving the output from said pulse generating means and developing therefrom the direct current voltage level of said pulse train, and indicating means receiving said direct current level signal and producing an indication in response thereto.

5. A monitoring means as defined in claim 4 wherein said pulse generating means comprises a relaxation oscillator including an RC time constant means including a capacitor, said time constant means defining the repetition rate of said relaxation oscillator and defining a time constant greater than the frequency of said reference frequency source, and means responsive to an output from said AND gate to provide a low impedance discharging path for said capacitor to inhibit operation of said relaxation oscillator.

6. A monitoring means as defined in claim 5 wherein the means providing a low impedance discharge path for said capacitor comprises a further transistor the base of which receives the output from said AND gate and the emitter-collector electrodes of which are respectively connected to the terminals of said capacitor.

No references cited.

ROY LAKE, *Primary Examiner.*

S. H. GRIMM, *Assistant Examiner.*